(12) United States Patent
Skalina

(10) Patent No.: US 7,015,948 B2
(45) Date of Patent: Mar. 21, 2006

(54) METHOD AND APPARATUS FOR REAL TIME TESTING OF DTV ANTENNA TRANSMITTING SYSTEMS IN TIME DOMAIN UNDER FULL POWER

(75) Inventor: Andre J. Skalina, Portland, ME (US)

(73) Assignee: SPX Corporation, Charlotte, NC (US)

(*) Notice: Subject to any disclaimer, the term of this patent is extended or adjusted under 35 U.S.C. 154(b) by 580 days.

(21) Appl. No.: 10/116,112

(22) Filed: Apr. 5, 2002

(65) Prior Publication Data

US 2003/0189641 A1 Oct. 9, 2003

(51) Int. Cl.
*H04N 17/00* (2006.01)

(52) U.S. Cl. .......................... 348/180; 348/192
(58) Field of Classification Search .......... 348/180, 348/181, 184, 192, 193; 342/55; 343/703; 725/68, 72
See application file for complete search history.

(56) References Cited

U.S. PATENT DOCUMENTS

| 4,122,400 A | 10/1978 | Medendorp et al. ........ 330/207 |
| 6,055,015 A * | 4/2000 | Edwards .................... 348/192 |
| 6,212,286 B1 | 4/2001 | Rott et al. .................. 382/100 |
| 6,307,896 B1 | 10/2001 | Gumm et al. ............... 375/316 |

FOREIGN PATENT DOCUMENTS

| JP | 03 190393 | 8/1991 |
| JP | 05 336008 | 12/1993 |
| WO | 00 64114 | 10/2000 |
| WO | 02 03580 | 1/2002 |

OTHER PUBLICATIONS

Cole G, et al., "Aerial Monitoring and Protection", Conference Proceedings of the International Broadcasting Convention, Brighton, Sep. 1988, pp. 23-27, IEE, GB, pp. 114-119, XP000232919 the whole document.

* cited by examiner

*Primary Examiner*—Victor R. Kostak
(74) *Attorney, Agent, or Firm*—Baker & Hostetler LLP

(57) ABSTRACT

A real time apparatus for testing a DTV antenna transmitting system, wherein the DTV antenna transmitting system transmits an original signal from a DTV transmitter to a DTV transmitting antenna, is disclosed that includes a probe, wherein the probe is connected in series with the DTV antenna transmitting system, and senses signals traversing the DTV antenna transmitting system. An error detector of the testing apparatus compares the received signal to the original signal to identify the magnitude and location of errors.

29 Claims, 1 Drawing Sheet

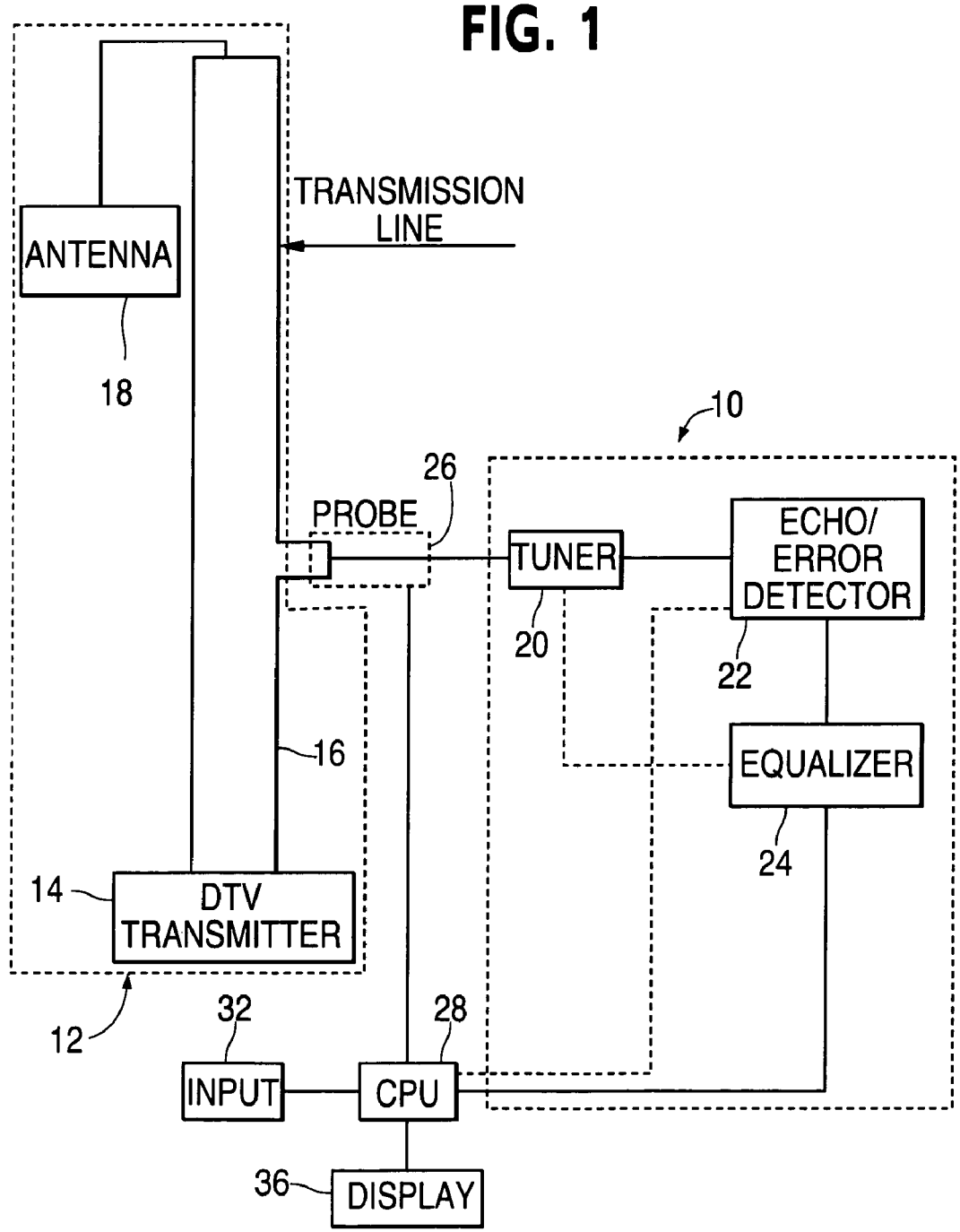

METHOD AND APPARATUS FOR REAL TIME TESTING OF DTV ANTENNA TRANSMITTING SYSTEMS IN TIME DOMAIN UNDER FULL POWER

FIELD OF THE INVENTION

The present invention relates generally to an antenna testing system. More particularly, the present invention is directed to a method and apparatus for real time testing of digital television (DTV) antenna transmitting systems.

BACKGROUND OF THE INVENTION

The Federal Communications Commission has required television broadcasters to transition from their current National Television System Committee (NTSC) analog antenna systems to DTV antenna systems. DTV technology allows for the transmission of television programming having higher resolution pictures and better sound quality than NTSC analog antenna systems. DTV systems also allow broadcasters to transmit more than one signal per channel, and thus, deliver more than one television program per station.

Test receivers exist for identifying problems in the transmission of a DTV signal from the DTV transmitting antenna to a particular point of reception, but problems can also occur in the transmission of the DTV signal from a DTV transmitter to the DTV transmitting antenna that prevent a signal generated by the DTV transmitter from reaching the DTV transmitting antenna.

Echoes are reflected signals that occur when the impedance is not properly matched between components of the DTV transmitting system and can be an indicator of potential problems in the transmission of a DTV signal. The echo/reflected signals "add to" or "subtract from" the signal being transmitted from the DTV transmitter to the DTV transmitting antenna, and, as such, increase or decrease the level of the DTV signal. Although echoes commonly occur during the transmission of a DTV signal, they will cause problems if their magnitude increases to a level that interferes with the transmission of the DTV signal.

When echo levels exceed an acceptable threshold, the signal received by the transmitting DTV antenna may differ greatly from the original signal that was sent by the DTV transmitter. The echoes may even cause the DTV signal and/or sound corresponding to a television program to be lost completely, and disrupt television service to a viewer. Testing devices are needed to analyze the performance of a DTV antenna transmitting system from the DTV transmitter to the transmitting antenna, and to provide data about the performance of the DTV antenna transmitting system, so that failures can be avoided. Methods exist for testing DTV transmitting systems that are capable of identifying whether or not echoes are occurring within a transmitting system. The conventional method of testing DTV transmitting systems requires going off-air and shutting down the DTV transmitting system, which can be costly, to connect the testing device to the transmission line. The conventional method of testing DTV transmitting systems utilizes a testing device, such as a network analyzer, that is connected to the transmission line via a connector/adapter. A low power test signal is then sent by the transmitter, and the network analyzer analyzes the signal received. The network analyzer is able to ascertain the magnitude of the problem (i.e., how much of the test signal was lost up to the point at which the network analyzer is connected) and the source or location of the signal loss. However, the network analyzer cannot be utilized to test DTV transmitting systems in real time while operating under full power. Additionally, the network analyzer is limited to a resolution of approximately a hundred feet if used with 6 MHz bandwidth, and thus unable to identify potential problems that are less than a hundred feet apart.

Another method of testing DTV antenna systems is described in U.S. Pat. No. 6,212,286 to Rott et al. (hereafter "Rott") which discloses a method of testing a DTV antenna transmitting system in real time and under full power. Rott involves a method for testing an antenna system that enables the source/location of a problem to be identified by aiming an infrared camera at the component of the transmitting system to be tested while the component is in full operation.

The infrared camera records a thermal image of the test object. When the temperature of a portion of the thermal image is extremely high when compared to the remainder of the thermal image, the portion of the test object corresponding to the high temperature area on the thermal image is likely to be the source of the problem. Typically, a sharp increase in temperature is an indicator of a malfunctioning component. Thus, the area of the thermal image where there is a temperature increase can be matched to the area of the component that was tested.

The thermal image generated from the testing method of Rott reveals extreme temperature gradients. If an echo is created, that only causes a small increase in temperature, the echo may go undetected by the infrared camera of Rott. As a result, DTV service to consumers may be interrupted by the effects of the undetected echo signal.

Accordingly, it is desirable to provide a real time method for testing DTV antenna transmitting systems from the DTV transmitter to the DTV transmitting antenna that is operable under full power.

Further, it is desirable to provide a method for real time testing of DTV antenna transmitting systems that can identify the magnitude and the location of existing and/or potential problems.

Further, it is desirable to provide a method for testing a DTV antenna transmitting system that minimizes time and cost in identifying and resolving a problem that occurs within a DTV antenna transmitting system.

SUMMARY OF THE INVENTION

In one aspect of the present invention a real time apparatus for testing a DTV antenna transmitting system, where the DTV antenna transmitting system transmits an original signal from a DTV transmitter to a DTV transmitting antenna is provided that includes a probe, wherein the probe is connected in series with the DTV antenna transmitting system, and wherein the probe senses a signal traversing the DTV antenna transmitting system and generates a received signal, and an error detector which compares the received signal to the original signal to identify an error, wherein the error detector identifies the magnitude and location of the error, and a processor, wherein the processor compares the magnitude of the error to a predetermined value.

In another aspect of the present invention a real time apparatus for testing a DTV antenna transmitting system, where the DTV antenna transmitting system transmits an original signal from a DTV transmitter to a DTV transmitting antenna is provided that includes a means for sensing a signal traversing the DTV antenna transmitting system in real time and generating a received signal, and a means for comparing the received signal to the original signal to identify an error, and wherein the comparing means identifies the magnitude and location of the error.

In yet another aspect of the present invention, a method for testing a DTV antenna transmitting system, wherein the DTV antenna transmitting system transmits an original signal from a DTV transmitter to a DTV transmitting antenna is provided that includes sensing a signal traversing the DTV antenna transmitting system in real time and generating a received signal, and comparing the received signal to the original signal to identify an error, and identifying the magnitude and location of the error.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF FIGURES

FIG. 1 is a block diagram of a system for testing, monitoring and/or optimizing an antenna system in accordance with the present invention.

DETAILED DESCRIPTION OF THE PREFERRED EMBODIMENTS OF THE PRESENT INVENTION

Referring now to FIG. 1, a testing device 10 is provided for testing a DTV antenna transmitting system 12 in accordance with the present invention. In an exemplary embodiment of the present invention, the testing device 10 detects errors, such as those caused by echoes, in the DTV antenna transmitting system 12. The DTV antenna transmitting system includes a DTV transmitter 14, a transmission line 16 and a DTV transmitting antenna 18.

In an exemplary embodiment of the present invention, the testing device 10 includes a tuner 20, an echo/error detector 22, and an equalizer 24. A probe 26, processor/central processing unit (CPU) 28, a display 30 and an input device 32 are connected to the testing device 10 to provide for input and output of data from the testing device 10.

The probe 26 is utilized to couple the testing device 10 to any point in the DTV antenna transmitting system 12. The probe 26 detects the signals that traverse the point in the DTV antenna transmitting system 12 to which the probe 26 is coupled. In exemplary embodiments of the present invention, the probe 26 is a voltage probe, current probe, single directional coupler or dual directional coupler. A directional coupler is a device that is utilized to sample a forward (incident) and/or backward (reflected) wave in a transmission line.

In an exemplary embodiment of the present invention, the probe 26 is connected in series with the DTV antenna transmitting system 12, such that the testing device 10 can monitor and/or test the signals traversing the DTV antenna transmitting system 12 continuously, at an instant point in time, and/or during discrete intervals in time. In an exemplary embodiment of the present invention the probe 26 and testing device 10 may be provided as part of the DTV antenna transmitting system 12.

In an exemplary embodiment of the present invention, the signal that is transmitted from the DTV transmitter 14 to the DTV transmitting antenna 18 is transmitted at a constant voltage level. The DTV signal is modulated at the DTV transmitter 14 by an eight-level VSB (8-VSB) standard, which is a modulation format that is utilized for the terrestrial transmission of DTV. The modulation format was established as the standard for DTV transmission in the United States by the Advanced Television Systems Committee (ATSC). The 8-VSB standard is considered an effective method for the transmission of DTV programming because it allows for either transmission of HDTV, or more than one standard DTV program (multicasting) and/or the transmission of other data along with a television program (data casting).

The tuner 20 is utilized to automatically or manually select a signal to be tested, monitored and/or optimized from the signals in the channel that are being transmitted from the DTV transmitter 14 to the DTV transmitting antenna 18 and sensed by the probe 26. In exemplary embodiments of the present invention, the tuner is utilized to demodulate the DTV signal.

The probe 26 senses the signals in the frequency domain, and outputs a waveform that indicates the magnitude of the signal of the signal as a function of frequency. In an exemplary embodiment of the present invention, the CPU 28 is coupled to the probe 26. The input device 32 is utilized to control the probe's level of sensitivity, i.e., the amount of the DTV signal that the probe is able to sense.

The recovered/received DTV signal that is sensed by the probe 26 may not correspond to the original signal that was transmitted by the DTV transmitter 14 if errors/echoes were generated during the transmission of the DTV signal from the DTV transmitter 14 to the DTV transmitting antenna 18. When echoes/error occur, the DTV signal will have varying signal levels, instead of one signal level.

The echo/error detector 22 is utilized to identify the occurrences of errors/echoes in the recovered signal by identifying where the DTV signal deviates from a constant level. The error detector 22 first identifies the baseband voltage by identifying the primary voltage from which the DTV signal is deviating. The levels of the recovered DTV signal is then compared to the identified baseband of the original DTV signal.

The error detector 24 generates an echo signal/error correction signal that corresponds to the differences between the baseband level of the original signal and the levels of the recovered signal. Accordingly, the amount of any "increases to" or "decreases from" the level of the original signal transmitted by the transmitter are attributed to echoes/errors, and the magnitude of the echoes/errors are known.

In an exemplary embodiment of the present invention, the display 30 is utilized to display the original signal, the recovered signal, and/or the echo/error correction signal.

The display is also utilized to display the echo level versus distance. In exemplary embodiments of the present invention, the magnitude of the signal is expressed, for example, in decibels, as a voltage standing wave ratio (VSWR) and/or by a reflection coefficient.

The error detector 22 generates an echo signal/error correction signal that corresponds to the differences between the baseband level of the original signal and the levels of the recovered signal. Accordingly, the amount of any "increases to" or "decreases from" the level of the original signal transmitted by the transmitter are attributed to echoes/errors, and the magnitude of the echoes/errors are known.

In an exemplary embodiment of the present invention, the distance is measured in feet or meters, the speed is 984 feet per microsecond or 299.9232 meters per micro second.

Accordingly, the location of the echo signal, relative to the DTV transmitter, can be identified by multiplying the speed of the signal by the time of the occurrence of the echo, which can be deduced from the echo signal generated. Thus, the distance can be easily calculated, and the magnitude of the echo signal can be displayed as a function of distance from a point in the DTV transmitting system 12.

In an exemplary embodiment of the present invention the CPU 28 is a processor that is utilized to convert the unit of measurements that will be utilized to display for example, the original signal, received signal, echo signal and or the echo signal level versus distance. The CPU 28 can be utilized, for example, to convert the magnitude of the signal level to decibels, a VSWR or a reflection coefficient.

In an exemplary embodiment of the present invention, the error/echo detector 22 is coupled to an equalizer 24. The equalizer 24 utilizes a 192-tap-decision feedback filter to generate a correction pixel that, if utilized, would reduce distortion in a signal caused by an echo/error.

The filter takes the coefficient weighted average of a finite number of source pixels (in this case 192), which are referred to as taps, to calculate the replacement/correction pixel for the pixel that is out of place because of the echo.

In an exemplary embodiment of the present invention, the filter samples/taps the DTV signal every ninety-three nano seconds. The error detector 22 of the present invention ascertains the magnitude and location of the echo signal by extracting the tap data, from the correction pixel data. The tap data corresponds to the energy of the echo signals. It should also be understood that other filters, which have a finite number of taps, may be utilized.

In an exemplary embodiment of the present invention, software is utilized, by for example, the CPU 28 to determine whether the echo/error signals are within an acceptable threshold. In another exemplary embodiment of the present invention, the software outputs an audible or visual alarm to alert a user of the test device 10 when the echoes/errors are at a level that threatens the performance of the DTV transmitting system 12.

In an exemplary embodiment of the present invention, the testing device 10 extracts the correction pixel data from the equalizer 24 and constructs or generates an echo/error correction signal that includes deviations, from the original signal of a constant voltage level, which correspond to the correction pixels. In an exemplary embodiment of the present invention, the equalizer 24 is an ATSC/8-VSB TV test receiver, either EFA models 50 or 53, by Rohde & Schwarz of München, Germany that has a resolution within forty-seven feet.

In an exemplary embodiment of the present invention, the tuner 20, error detector 22, and equalizer 24 are incorporated into the testing device 10.

It should be understood that the tuner 20, equalizer 24, probe 26, CPU 28, display 30, and input device 32 may exist separately from the error detector 22, either alone or in combination with another device.

It should also be understood that a testing device 10 in accordance with the present invention can also be utilized with other systems, for example, cellular systems, personal communications systems, and satellite systems.

By utilizing a testing device 10 in accordance with the present invention, which identifies the magnitude and location or errors/echoes in real time and under full power, a user of the testing device can identify errors/echoes that are of a magnitude that could interfere with the transmission of the DTV signal from the DTV transmitter 14 to the DTV transmitting antenna 18 without shutting down the DTV transmitting system. A user of the testing device 10 of the present invention can also adjust the components of the DTV transmitting system 12, which correspond to the location of where the error signal is occurring, to optimize the performance of the DTV transmitting system.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed:

1. A real time apparatus for testing a DTV antenna transmitting system, wherein the antenna transmitting system transmits an original signal from a DTV transmitter to a DTV transmitting antenna, comprising:
   a probe, wherein the probe is connected in series with the DTV antenna transmitting system, and wherein the probe senses a signal traversing the DTV antenna transmitting system in real time and generates a received signal;
   an error detector to identify an error, and wherein the error detector identifies the magnitude and location of the error;
   a processor, wherein the processor compares the magnitude of the error to a predetermined value; and
   an equalizer, wherein the error detector is coupled to the equalizer and, wherein the equalizer compares the received signal to the original signal.

2. The apparatus of claim 1, further comprising a tuner, wherein the tuner receives the received signal.

3. The apparatus of claim 1, wherein the processor outputs an alarm.

4. The apparatus of claim 1, wherein the equalizer utilizes a filter to identify the error.

5. The apparatus of claim 4, wherein the filter is a 192-tap-decision-feedback filter.

6. The apparatus of claim 1, wherein the error detector generates an error signal and wherein the error signal is an echo signal.

7. The apparatus of claim 1, further comprising a display.

8. The apparatus of claim 1, wherein the equalizer is an ATSC/8-VSB EFA test receiver manufactured by Rohde and Schwarz.

9. The apparatus of claim 8, wherein the error detector extracts the error signal from the equalizer.

10. The apparatus of claim 9, wherein the processor changes the units of measurements utilized by the equalizer.

11. A real time apparatus for testing a DTV antenna transmitting system, wherein the DTV antenna transmitting system transmits an original signal from a transmitter to a transmitting antenna, comprising:

means for sensing in real time a signal traversing the DTV antenna transmitting system and generating a received signal;

means for comparing the received signal to the original signal to identify an error, and wherein the comparing means identifies the magnitude and location of the error by use of an equalizer.

12. The apparatus of claim 11, further comprising a means for selecting the received signal to be tested.

13. The apparatus of claim 11, further comprising a means for recovering the original signal from the received signal.

14. The apparatus of claim 11, wherein the sensing means is a voltage probe.

15. A method for testing a DTV antenna transmitting system, wherein the DTV antenna transmitting system transmits an original signal from a DTV transmitter to a DTV transmitting antenna, comprising:

sensing a signal traversing the DTV antenna transmitting system in real time and generating a received signal; and comparing the received signal to the original signal to identify an error; and identifying the magnitude and location of the error, wherein the error is an echo.

16. The method of claim 15, further comprising:

analyzing the error utilizing software; and determining the potential effect of the error on the DTV transmitting system.

17. A real time apparatus for testing a DTV antenna transmitting system, wherein the antenna transmitting system transmits an original signal from a DTV transmitter to a DTV transmitting antenna via a transmission line, comprising:

a probe, wherein the probe is connected in series with the transmission line of the DTV antenna transmitting system, and wherein the probe senses a signal traversing the DTV antenna transmitting system in real time and generates a received signal;

a tuner that receives the received signal;

an equalizer, wherein the equalizer determines a value of an echo in the received signal;

a processor, wherein the processor compares the received echo signal to the original signal to identify an error; and an error detector which identifies a magnitude and location of the error.

18. The apparatus of claim 17, wherein the error detector is a human.

19. The apparatus of claim 17, wherein the error detector is the processor.

20. The apparatus of claim 17, wherein the error signifies a time-based location of an anomaly in the transmission system.

21. The apparatus of claim 17, wherein the error signal initiates a warning.

22. The apparatus of claim 17, wherein the equalizer utilizes a tap filter wherein each tap in the tap filter corresponds to a portion of the traversing signal delayed in time.

23. The apparatus of claim 22, wherein the tap filter utilizes a tap delay window up to 5 microseconds.

24. The apparatus of claim 22, wherein the tap filter is a tap-decision feedback filter.

25. The apparatus of claim 24, wherein the tap decision feedback filter generates a correction pixel.

26. The apparatus of claim 22, wherein the tap filter produces a coefficient weighted output of a finite number of source pixels.

27. The apparatus of claim 22, wherein the filter samples the received signal within 93 nano-second steps.

28. An apparatus capable of testing a Digital Television (DTV) transmitting system in real-time, the DTV transmitting system having a DTV transmitter, a transmission line and an antenna, wherein the DTV transmitter is configured to transmit one or more incident DTV signals to the antenna via the transmission line, the apparatus comprising:

a probe that, when coupled to the transmission line, can sense real-time DTV signals traversing the transmission line to produce a probe output signal, wherein the probe output signal includes at least a first incident DTV signal and a first echo signal produced from the first incident DTV signal at a first error location along the transmission line;

an equalizer coupled to the probe, the equalizer being capable of calculating one or more tap-delay values based on the first incident DTV signal and the first echo signal; and an error determining device that receives the tap-delay values to determine error information that includes at least one of echo magnitude data and time data related to the first error location.

29. The apparatus of claim 28, further comprising a display that receives the error information and provides a human-readable display of the error information.

\* \* \* \* \*

Adverse Decision in Interference

Patent No. 7,015,948, Andre J. Skalina, METHOD AND APPARATUS FOR REAL TIME TESTING OF DTV ANTENNA TRANSMITTING SYSTEMS IN TIME DOMAIN UNDER FULL POWER, Interference No. 105,585, final judgment adverse to the patentees rendered May 7, 2008 as to claims 1-29.

*(Official Gazette October 14, 2008)*